United States Patent [19]

Kyoukane et al.

[11] Patent Number: 5,115,183
[45] Date of Patent: May 19, 1992

[54] BATTERY CHARGING SYSTEM FOR MOTOR-GENERATOR

[75] Inventors: Yasuaki Kyoukane; Toshihiro Nagano, both of Omiya, Japan

[73] Assignee: Fuji Jukogyo Kabushiki Kaisha, Tokyo, Japan

[21] Appl. No.: 611,059

[22] Filed: Nov. 9, 1990

[30] Foreign Application Priority Data

Nov. 13, 1989 [JP] Japan .................. 1-295691
Nov. 24, 1989 [JP] Japan .................. 1-304980

[51] Int. Cl.⁵ .................. H02J 7/32; B60L 11/12
[52] U.S. Cl. .................. 320/61; 320/62; 320/64; 180/65.2; 322/29
[58] Field of Search .......... 320/46, 62, 61, 64; 322/29; 180/65.2

[56] References Cited

U.S. PATENT DOCUMENTS

| | | | |
|---|---|---|---|
| 3,623,568 | 11/1971 | Mori | 180/65.2 |
| 3,808,481 | 4/1974 | Rippel | 180/65.2 |
| 3,991,357 | 11/1976 | Kaminski | 322/32 |
| 4,021,677 | 5/1977 | Rosen et al. | 180/65.2 |
| 4,042,056 | 8/1977 | Horwinski | 180/65.2 |
| 4,119,862 | 10/1978 | Gocho | 180/65.2 |
| 4,309,620 | 1/1982 | Bock | 290/4 R |
| 4,313,080 | 1/1982 | Park | 180/65.2 |
| 4,330,743 | 5/1982 | Glennon | 322/10 |
| 4,351,405 | 9/1982 | Fields et al. | 180/65.2 |
| 4,451,776 | 5/1984 | Iwaki et al. | 322/22 |
| 4,465,963 | 8/1984 | Iseard | 320/46 |
| 4,543,521 | 9/1985 | Morishita et al. | 320/64 |
| 4,551,667 | 11/1985 | McAuliffe | 320/46 |
| 4,607,336 | 8/1986 | Morishita et al. | 364/424 |
| 4,608,639 | 8/1986 | Morishita et al. | 364/424 |
| 4,617,626 | 10/1986 | Morishita et al. | 364/424 |
| 4,629,968 | 12/1986 | Butts et al. | 322/29 |
| 4,651,081 | 3/1987 | Nishimura et al. | 320/64 |
| 4,659,977 | 4/1987 | Kissel et al. | 320/64 |
| 4,682,097 | 7/1987 | Matsui | 320/64 |
| 4,739,244 | 4/1988 | Komurasaki et al. | 322/29 |
| 4,841,216 | 6/1989 | Okada et al. | 322/29 |
| 4,843,299 | 6/1989 | Hutchings | 320/31 |
| 4,883,724 | 11/1989 | Yamamoto | 429/23 |

FOREIGN PATENT DOCUMENTS 0039235 2/1989 Japan .................. 320/61
1161752 8/1969 United Kingdom .......... 320/61

OTHER PUBLICATIONS

"Some Hybrid Propulsion Systems for Road Vehicles", by G. Thomas, Electronics & Power (Feb. 1977).

Primary Examiner—Steven L. Stephan
Assistant Examiner—Thomas M. Dougherty
Attorney, Agent, or Firm—Beveridge, DeGrandi & Weilacher

[57] ABSTRACT

A battery charging system for a motor-generator, having a generator for charging a battery, and an engine for driving the generator, comprises a generator speed sensor for detecting a generator speed of the generator; and an engine speed control circuit for controlling an engine speed of the engine in the manner that the generator speed is set to a predetermined speed. The system can improve a charged efficiency and a long-life battery by charging the battery to control a speed of the generator so as to perform a feedback control of the engine without keeping the engine speed at a constant speed, and by adaptively controlling the battery by detecting gases occurring in the battery, namely, a gassing.

17 Claims, 9 Drawing Sheets

BATTERY CHARGING SYSTEM FOR MOTOR-GENERATOR

BACKGROUND OF THE INVENTION

The present invention relates to a battery charging system for charging a battery by a generator driven by an engine, and more particularly to the charging system for charging the battery efficiently in the manner that the generator is controlled at a constant speed by feedback control and that the battery is adaptively charged in accordance with gases generated in the battery (hereinunder called as gassing).

There is recently proposed an electric vehicle having an electric motor as a driving source, which is developed to achieve low pollution without using petroleum fuel, or a hybrid motor vehicle in which an internal combustion engine is combined with the electric motor. In such a vehicle, battery conditions influence performance of the vehicle to determine the maximum mileage in dependency on a power capacity of the battery.

The vehicle needs a charging device for efficiently charging the batteries to improve the performance. For example, Japanese Issued Patent Publication No. 49-30648 (1974) discloses a charging device as the prior art of this invention.

In the prior art, the charging device comprises an internal combustion engine with a generator in order to charge the battery, a switching circuit connected to a power source, and both an ignition device and a starter connected to the source through the switching circuit for respectively igniting and starting the engine. The switching circuit actuates the ignition device and the starter when battery energy becomes lower than a predetermined level, and the circuit stops the starter when starting operation of the engine finishes. At the same time, the switching circuit stops to provide the power to the ignition device when engine load becomes lower than a predetermined value. As a result, charging efficiency of the battery is improved by driving the engine in a high-efficient region.

However, even though an engine speed is maintained at a fixed speed for driving the generator, a generator speed is not maintained at the same speed because of a power transmission loss due to slipping of a belt which connects the engine with the generator, so that it is difficult to precisely control the charging.

Namely, having the relation with load connected to the output, the output of the generator is not maintained in an optimum state even when the engine speed is maintained at the fixed speed. The conventional charging device has the problem that the engine speed must be changed to a proper speed corresponding to the battery condition in each occasion.

Furthermore, the battery mounted on the vehicle has a phenomenon that an amount of gases such as hydrogen ($H_2$) and oxygen ($O_2$) sharply increases at the end of charging. The phenomenon is called "gassing". Namely, most of the charging energy is consumed by the electrolysis of water, thereby wasting the power.

Gassing occurrence is detected only by human eye so that the battery charging efficiency and construction of an automatic charging system is not improved. The gassing occurrence causes the battery electrolyte to decrease rapidly, thereby shortening the battery life and resulting the possibility of fire by flammable gas.

SUMMARY OF THE INVENTION

In view of the above condition, a primary object of the present invention is to provide a battery charging device capable of precisely controlling a charging by a proper control of a generator without an influence of a power transmission loss such as a slip of belt connected between the generator and an engine.

Furthermore, a secondary object of the present invention is to provide a battery charging device capable of preventing a danger of flammable gases, and improving charging efficiency to achieve a long-life battery by controlling the charging in dependency on a gassing occurrence while charging the battery.

In order to achieve the above objects, a battery charging device according to the present invention, having a generator for charging a battery and an engine for driving the generator, comprises a generator speed sensor for detecting a generator speed and for outputting a generator speed signal, and a control circuit for controlling an engine speed in dependency on the signal output from the sensor.

Namely, the generator speed sensor detects the generator speed when the engine drives the generator, and the engine speed is controlled by the generator speed signal, thereby charging the battery.

As the battery charging device of the present invention comprises the control circuit for controlling the engine speed in dependency on the generator speed, the generator speed is precisely controlled and the proper charging control can be performed without receiving influence of a power transmission loss such as a belt slip.

For controlling the generator speed, the charging device comprises a charging setting circuit for setting an output value of the generator when charging the battery, a generator speed setting circuit for setting a desired generator speed corresponding to the output value set by the charging setting circuit, a generator speed calculating circuit for calculating the generator speed, and an engine speed control circuit for controlling the engine speed in dependency on the desired generator speed and the generator speed.

Namely, the desired generator speed is set in dependency on the output value when the output value is set when charging the battery. The engine speed is controlled in dependency on the desired generator speed and an actual generator speed.

With the above circuits, the generator output is constantly maintained at a proper level corresponding to a predetermined charging mode without receiving influence of load, thereby improving battery charging efficiency.

Furthermore, in order to achieve the secondary object, the battery charging device of the present invention comprises a gas detecting element for detecting gases occurring in the battery with the charging, a gassing discriminating circuit for discriminating a gassing occurrence in dependency on an output from the gas detecting element, and a charging control circuit for controlling the charging of the battery in dependency on a discriminated result from the discriminating element.

As the present invention detects the gassing as described above, it is possible to constantly and precisely control the charging and to prevent energy loss, thereby improving the charging efficiency.

According to the present invention, the battery has a long-life and it is possible to prevent a danger by flammable gases.

DETAILED DESCRIPTION OF THE PREFERRED EMBODIMENTS

There will now be described in detail several preferred embodiments of the present invention with reference to the attached drawings.

Figure 1:
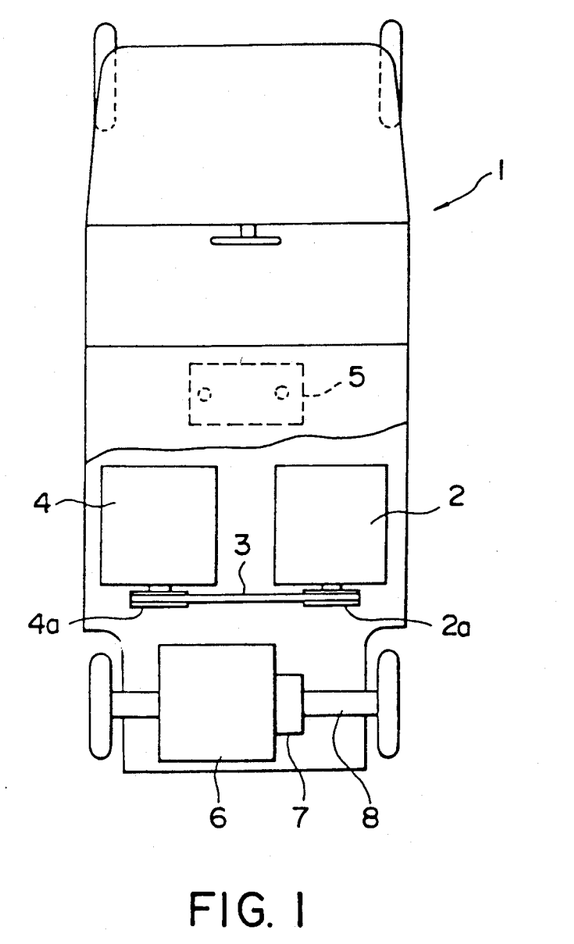
FIG. 1 is a block diagram showing a hybrid vehicle to which a battery charging device of the present invention.

FIGS. 1 to 4 show a first embodiment of the present invention. In FIG. 1 showing a hybrid vehicle, an electric motor car 1 comprises an internal combustion engine 2 having a crank pulley 2a, a belt 3 with a generator 4 to charge a battery 5 and to start the engine 2 as a starter. The car 1 further has an electric motor 6 as a driving power source to supply an electric power from the battery 5, a change gear 7, and an axle connected to the motor 6 through the gear 7.

The electric car 1 is a so-called serial hybrid vehicle, in which an output of the engine 2 is changed to an electric energy by the generator 4, and the electric energy stored in the battery 5 drive the motor 6 to run the car 1.

Figure 2:
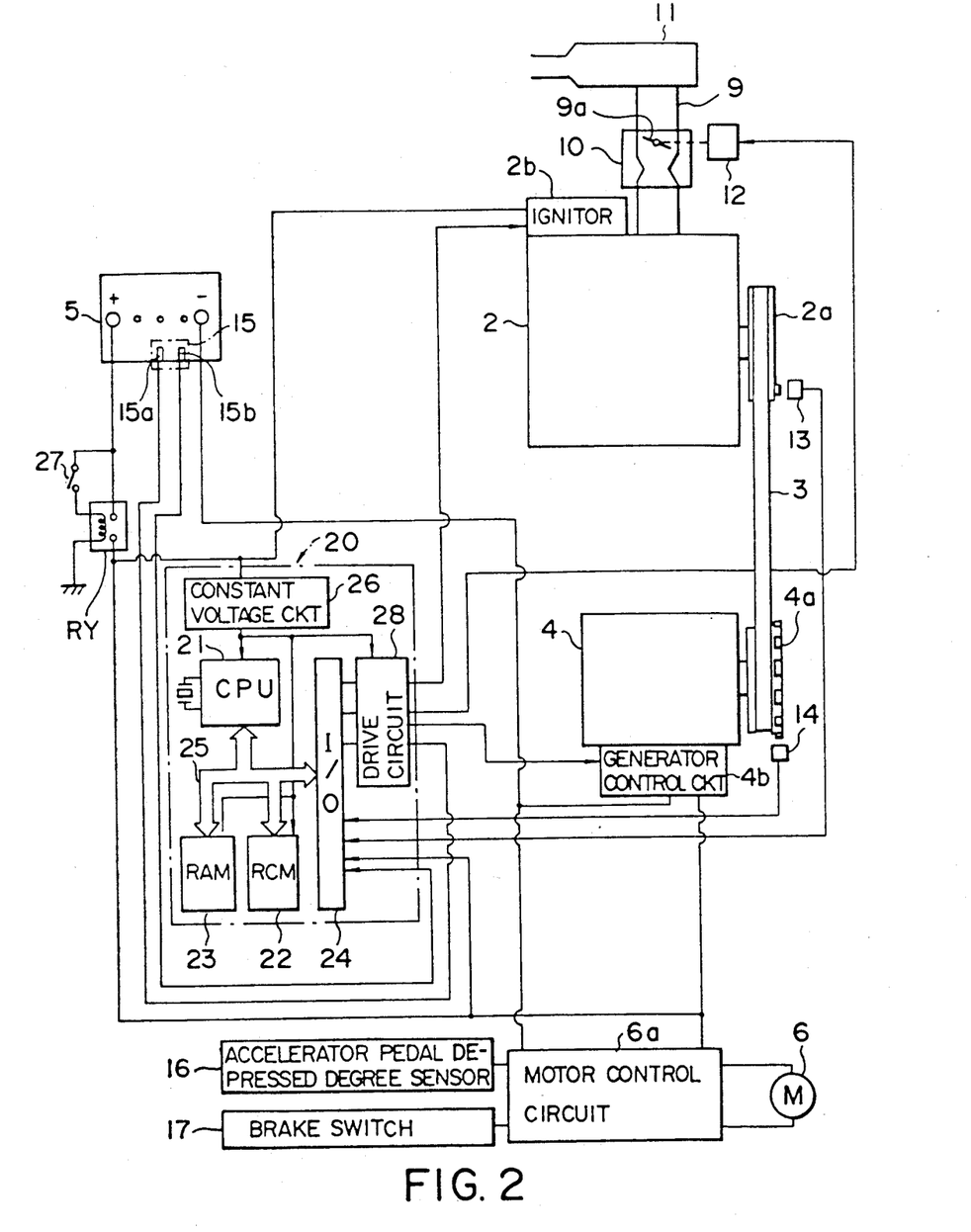
FIG. 2 is the block diagram showing a charging control system of the charging device according to a first embodiment of the present invention.

In the first embodiment, the engine 2 is a gasoline engine, as shown in FIG. 2, which has an intake pipe 9 connected between a carburetor 10 and an air cleaner 11 upstream of the pipe 9.

The pipe 9 further has a throttle valve 9a actuated by such a rotary actuator 12 as a stepping motor or a rotary solenoid.

A crank angle sensor 13 such as an electro-magnetic pickup is provided and arranged near one side of the pulley 2a in order to detect a predetermined crank angle such as a fixed ignition timing in the first embodiment. A generator sensor 14 such as the electro-magnetic pickup is installed and arranged near an outer surface of a pulley 4a of the generator 4.

Furthermore, the battery 5 has a gas detecting circuit 15 for detecting gases occurring from an electrolyte because of an overcharge. The detecting circuit 15 comprises a light emitting element 15a and a light receiving element 15b which face each other. The receiving element 15b detects an emitted light output from the emitting element 15a, thereby detecting gases such as the gassing occurring from the electrolyte by the charging in dependency on the quantity changes of light. The gas detecting circuit 15 may be formed by a gas sensor which directly detects gases without the quantity changes of light.

On the other hand, numeral 20 denotes a control unit such as a micro-computer. The unit 20 comprises a central processing unit (CPU) 21, a read only memory (ROM) 22, a random access memory (RAM) 23, an input/output (I/O) interface 24, a bus line 25 for connecting the CPU 21, ROM 22, RAM 23 and I/O interface 24 each other, and a constant voltage circuit 26 connected through a relay contact of a control relay RY to the battery 5 and for supplying every part with electric power.

The relay RY is connected through a key switch 27 to the battery 5 and has the relay contact to which the circuit 26, an ignitor 2b, a generator control circuit 4b and a motor control circuit 6a are connected, so that the battery 5 supplies each thereof with the electric power.

A depressing degree sensor 16 of an accelerator pedal and a brake switch are connected to the motor control circuit 6a. The speed of the electric motor 6 is controlled an output signal from the sensor 16 and stop a power supply to the motor 6 by the brake switch 17.

The crank angle sensor 13, generator speed sensor 14, receiving element 15b are connected to an input port of the I/O interface 24. The relay contact of the control relay RY is also connected to the input port of the interface 24 so that a terminal voltage of the battery 5 is monitored. On the other hand, an output port of the interface 24 is connected to the rotary actuator 12, ignitor 2b and generator control circuit 4b through a driving circuit 28.

Figure 3:
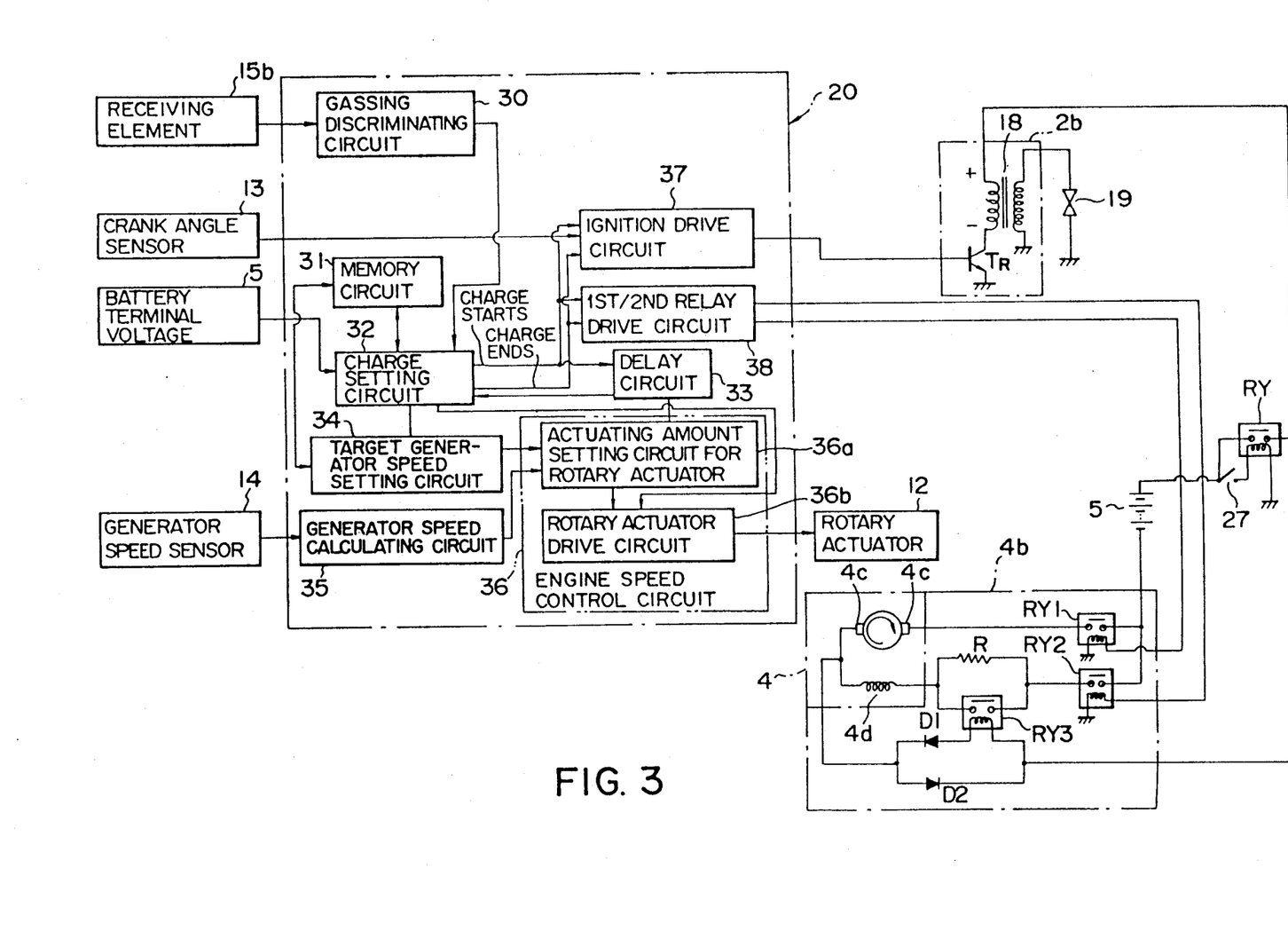
FIG. 3 is the block diagram showing a functional component of the charging device according to the first embodiment.

The ignitor 2b has an ignition coil 18 and such a switching device as a transistor TR. As shown in FIG. 3, a plus terminal for a primary coil side mounted on the ignition coil 18 is connected to the relay contact of the control relay RY, and a minus terminal is connected to the switching device such as the transistor TR. Furthermore, an ignition plug 19 is connected to a secondary coil side of the ignition coil 18 and an ignition portion of the plug 19 is exposed into a combustion chamber of the engine 2.

The generator control circuit 4b controls to change function of the generator 4 as the starter and generator. As shown in FIG. 3, the circuit 4b comprises two brushes 4c, a first relay RY1 which is connected between one of the brushes 4c and the control relay RY through the battery 5, a second relay RY2 which is connected between the other of brushes 4c and the battery 5, a third relay RY3 which is connected between the second relay RY2 and the other of brushes 4c, a field coil 4d connected between the other of brushes 4c and the third relay RY3, a resistor connected between the second relay RY2 and field coil 4d parallel to the third relay RY3, a first diode D1 connected between the third relay RY3 and the other of the brushes 4c with parallel to the field coil 4d in the regular order, and a second diode D2 connected in parallel to the first diode D1 and the third relay RY3. A connecting point of the third relay RY3 and the second diode D3 is connected to the other contact of the control relay RY.

The ROM 22 stores such a fixed data as a control program and a control data, and the RAM 23 stores data after calculating signals output from the sensors 13. 14 and 15b, and a monitor value of the terminal voltage of the battery 5.

The CPU 21 processes signals output form sensors according to the control program stored in the ROM 22, and calculates an ignition signal to the ignitor 2b, a control signal to the generator control circuit, 4b, and a driving signal to the rotary actuator 12 so, as to start and stop the engine 2, thereby controlling the charging of the battery 5 in a predetermined charging mode.

Functional Construction of Control Unit

Regarding functions of battery charging control, as shown in FIG. 3, the control unit 20 comprises a gassing discriminating circuit 30, a memory circuit 31 including the RAM 23, a charge setting circuit 32, a delay circuit 33, a target generator speed setting circuit 34, a generator speed calculating circuit 35, an engine speed control circuit 36, an ignition driving circuit 37, and a first and second relays driving circuit 38.

The control circuit 36 comprises a rotary actuator activating amount setting circuit 36a and a rotary actuator driving circuit 36b.

The gassing discriminating circuit 30 reads out a voltage $E_L$ output from the receiving element 15b of the gas detecting circuit 15, discriminates the so-called gassing, namely, as to whether or not the gases occur in the electrolyte of the battery 5 at the end of completing the charge, and outputs the discriminated result to the charging setting circuit 32.

Namely, in the electrolyte of the battery, the receiving element 15b detects a light output from the emitting element 15a opposite to the receiving element 15b. The gassing is determined to occur when the voltage $E_L$ corresponding to the amount of the received light is under a predetermined target voltage $E_0$ for discriminating the gassing, for example, the target value is 90% of the output voltage when the gassing does not occur.

The charging setting circuit 32 discriminates a charging discriminating flag FLAG of a predetermined address of the memory circuit such as the RAM 23. The circuit 32 compares a terminal voltage $V_T$ of the battery 5 with a preset low limit voltage $V_L$ (such as 11 V) when the flag is "FLAG = 0", that is, the battery 5 is not presently charging (in the state of stopping the engine).

When the compared result is "$V_T < V_L$", the circuit 32 directs the target generator speed setting circuit 34 to execute the initial set, and outputs a charge starting signal to the first and second relay driving circuit 38 to start the engine 2, thereby starting the battery 5 to be charged. Furthermore, the circuit 32 also outputs the charge starting signal to the delay circuit 33 to count such set time as 3-10 sec. After counting, namely, the set time passes from the charge starting by engine starting, the circuit 32 reads the terminal voltage $V_T$ of the battery 5, thereby discriminating as to whether or not the terminal voltage $V_T$ is in the region between the high limit voltage $V_H$ (such as 15 V) and the low limit voltage $V_L$. When the state is "$V_L > V_T$" or "$V_H < V_T$", the circuit 32 supplies the compared result to the target generator speed setting circuit 34.

On the other hand, when the flag is "FLAG = 1" and the battery 5 has been already charging (the engine operating state), the circuit 32 reads the terminal voltage $V_T$, thereby discriminating as to whether the terminal voltage $V_T$ of the battery 5 during charging is in the range between the high limit voltage $V_H$ and the low limit voltage $V_L$. The circuit 32 outputs the compared result to the target generator speed setting circuit 34 when the state is "$V_L > V_T$" or "$V_H < V_T$".

When the circuit 32 determines the terminal voltage to be "$V_L \leq V_T \leq V_H$", or when an execution is directed from the rotary actuator activated amount setting circuit 36a of the engine speed control circuit 36 through the delay circuit 33, the charge setting circuit 32 reads the discriminated result of the gassing discrimination circuit 30. When the absence of the gassing is discriminated, the circuit 32 sets the charge flag "FLAG←1" to maintain the charge state. On the contrary, when the circuit 30 discriminates the gassing, the circuit 32 clarifies the charge flag "FLAG←0" to return the throttle valve 9a to the full-closed position by the rotary actuator 12 through the driving circuit 36 and outputs the charge end signal to the ignition driving circuit 37 and the first and second driving circuit 38 to stop the engine 2, thereby completing the charging.

The setting circuit 34 sets the target generator speed $S_i$ to such an initial speed $S_0$ as 3,000 rpm in dependency on the direction of the initial setting execution from the charge setting circuit 32. On the other hand, when the compared result of the circuit 32 is "$V_L > V_T$", the circuit 34 renews the target generator speed $S_i$ by adding such a set speed $\Delta S$ as 50 rpm with the present target generator speed $S_i$ stored in the memory circuit 31 ($S_i \leftarrow S_i + \Delta S$) in order to increase the charged voltage of the battery. When the result is "$V_H < V_T$", the circuit 34 renews the target generator speed $S_i$ by subtracting the set speed $\Delta S$ from the present target generator speed $S_i$ ($S_i \leftarrow S_i - \Delta S$) in order to decrease the charged voltage of the battery because the voltage is too high.

The calculating circuit 35 reads signals output from the generator speed sensor 14 and calculates the generator speed $S_{GE}$ in dependency on an output interval.

The actuator activating amount setting circuit 36a calculates a differential amount $\Delta$ in dependency on the target generator speed $S_i$ set in the circuit 34 and generator speed $S_{GE}$ set in the calculating circuit 35 ($\Delta = S_i - S_{GE}$), thereby setting the activating amount of the rotary actuator 12 corresponding to the differential amount. The circuit 36a drives the actuator 12 by the driving circuit 36b and controls the generator speed $S_{GE}$ to be the target generator speed $S_i$ by regulating the opening degree of the throttle valve of the engine 2, thereby eliminating influences by slipping of the belt and being capable of precisely controlling the generator 4 speed and the charge of the battery 5.

The setting circuit 36a directs the charge setting circuit 32 to read the discriminated result from the gassing discriminating circuit 30 by the delay circuit 33 at passing a predetermined time (such as 0.5-2 sec) after setting the activating amount of the actuator. The reason why the delay time is set in the such a manner, is to compensate for the time lag occurring in the time duration from the set of the activating amount of the actuator through the change of the actual generator speed $S_{GE}$ to the stabilized state of the battery.

The ignition driving circuit 37 turns on or off the primary coil of the ignition coil 18 in dependency on the fixed ignition angle signals from the crank angle sensor 11 when the circuit 37 receives the charge starting signal, thereby sparking the ignition plug 19. The circuit 37 stops its operation in dependency on the stop signals from the charge setting circuit 32, thereby maintaining the non-conductive condition of the primary coil of the ignition coil 18 and stopping the engine 2.

The driving circuit 38 turns on both the first and second relays RY1 and RY2 of the generator control circuit 4b in dependency on the charge start signals from the setting circuit 32 to actuate the generator as the starter. The circuit 38 turns off both the first and second relays RY1 and RY2 in dependency on the charge completing signals from the setting circuit 32 to complete the charge by cutting the connection between the generator 4 and the battery 5.

Namely, the battery 5 supplies a current through the relay RY3 and the diode D1 to the brushes 4c when the engine 2 stops and when both the relays RY1 and RY2 are turned on, so that the relay RY3 is turned on to form the starter circuit by closing the ordinarily opening contact, thereby supplying the current to the field coil 4d through the brushes 4c without way of the resistor R. As the result, the generator 4 is driven by the current flowing the field coil 4d and starts the engine 2 through the belt 3.

Current of the starter circuit decreases when the generator speed increases by starting the engine 2 so that the current becomes "0" to turn off the relay RY3. When the engine speed further increases, current flows in the opposite direction from the field coil 4d through the resistor R, thereby charging the battery. After that, when both the relays RY1 and RY2 are turned off, thereby shutting the connection between the generator 4 and the battery 5 to complete the charge.

Operation

Figure 4:
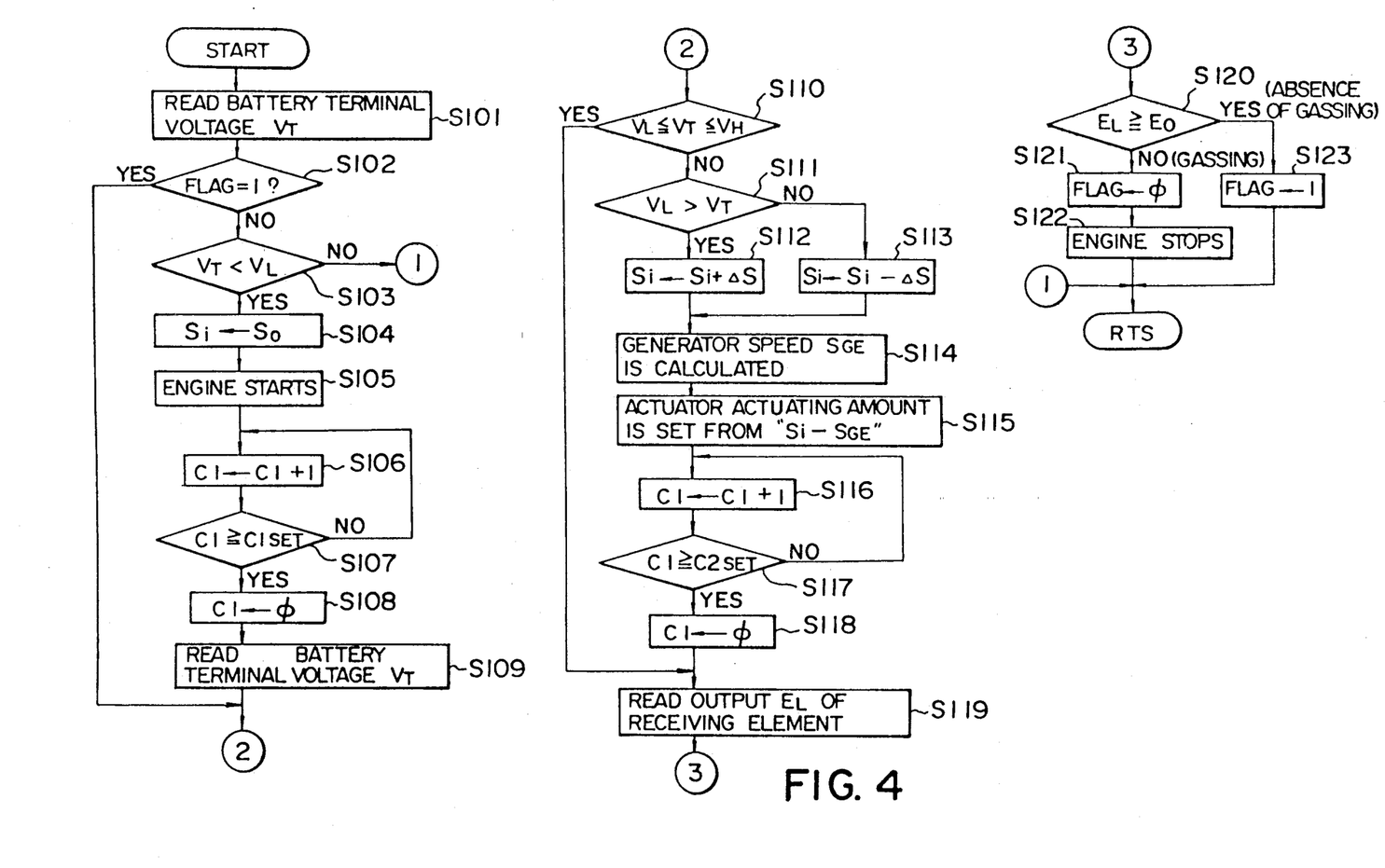
FIG. 4 is a flow chart showing a charging control procedure of the charging device of the first embodiment.

There is described a charge control procedure of the above components according to a flow chart shown in FIG. 4.

The program shown in the flow chart of FIG. 4 is the program to be executed at every predetermined time or every predetermined cycle and the charge control procedure by a constant voltage mode.

First, when the relay contact of the control relay RY is closed by turning on the key switch 27, the battery 5 supplies the power to execute the initialization, thereby clarifying the flag for discriminating the charge of the predetermined address of the RAM 23 to "FLAG=0" for executing the program.

At a step S101, the terminal voltage $V_L$ of the battery 5 is read out, and there is discriminated the condition of the flag FLAG for discriminating the predetermined address of the RAM 23 in a step S102.

At the step S102, operation jumps to a step S110 when the condition is "FLAG=1", namely, the battery 5 is determined to be during the charging. Operation advances from the step S102 to a step S103 for discriminating whether or not the battery terminal voltage $V_T$ read in the step S101 is deteriorated under the lower limit voltage $V_L$ when the battery 5 does not charge during the stop of the engine 2 in the condition "FLAG=0".

At the step S103, operation ends the program when the condition is "$V_T > V_L$". Operation advances from the step S103 to a step S104 when the condition is "$V_T < V_L$", thereby setting the target generator speed $S_i$ to the initial speed $S_0$ ($S_i \leftarrow S_0$) and storing the speed $S_i$ in the predetermined address of the RAM 23. At the same time, the initial actuator activating amount corresponding to the speed $S_i$ is set to drive the actuator 12, thereby opening the throttle valve 9a at the initial set opening degree. In a step S105, both the relays RY1 and RY2 of the generator control circuit 4b are turned on to operate the generator 4 as the starter and the ignition signals are output to the ignitor 2b to start the engine 2.

Next, in a step S106, a count value $C_1$ of the counter is counted up ($C_1 \leftarrow C_1 + 1$). At a step S107, the count value $C_1$ is discriminated to achieve a set value $C_{1SET}$. In the case of "$C_1 < C_{1SET}$", operation returns to the step S106, and in the case of "$C_1 > C_{1SET}$", operation advances to a step S108.

At the step S108, the count value $C_1$ of the counter is clarified ($C_1 \leftarrow 0$), and the battery terminal voltage $V_T$ is read out in a step S109. Namely, the voltage $V_T$ is read out after the engine speed becomes stable by passing the predetermined time (such as 3-10 sec) from the start of the engine in the steps S106 and S107.

At the step S110, the terminal voltage $V_T$ read from the battery in the step S102 or S109 is discriminated as to whether it is in the region between the low and high limit voltage $V_L$ and $V_H$ ($V_L \leq V_T \leq V_H$) or not. If the voltage $V_T$ is in the region, namely, $V_L \leq V_T \leq V_H$, operation jumps to a step S119.

On the other hand, when the condition is discriminated to be "$V_L > V_T$" or "$V_T > V_H$" in the step S110, operation advances to a step S111. In the step S111, the battery voltage $V_T$ read in the step S101 or S109 is compared with the low limit voltage $V_L$. In the case of "$V_L > V_T$", operation advances to a step S112 to read out the target generator speed $S_i$ stored in the predetermined address of the RAM 23, thereby increasing and renewing the target generator speed $S_i$ by adding the set speed $\Delta S$ with the speed $S_i$ ($S_i \leftarrow S_i + \Delta S$). Namely, when the voltage $V_T$ is below the low limit voltage $V_L$, the target generator speed $S_i$ increases with the set speed $\Delta S$ in order to raise the charge voltage.

At the step S111, when the condition is discriminated to be "$V_L > V_T$", namely, "$V_T > V_H$", operation advances to a step S113, thereby renewing the target generator speed $S_i$ by subtracting the set speed $\Delta S$ from the target generator speed $S_i$ ($S_i \leftarrow S_i - \Delta S$). Namely, when the terminal voltage $V_T$ is higher than the high limit value $V_H$, the target generator speed $S_i$ is reduced with the set speed $\Delta S$ for decreasing the charge voltage.

At a step S114, an output voltage of the generator speed sensor 14 is read to calculate the rotation speed $S_{GE}$ of the generator 4. In a step S115, a differential amount $\Delta$ is calculated by generator speed $S_{GE}$ in the step S114 from the target generator speed $S_i$ in the step S112 or S113 ($\Delta = S_i - S_{GE}$), thereby setting the activating amount corresponding to the rotary actuator 12 in dependency on the differential amount $\Delta$.

Next, at a step S116, the count value $C_1$ of the counter is counted up ($C_1 \leftarrow C_1 + 1$). In a step S117, the count value $C_1$ is discriminated to reach the set value $C_{2SET}$, so that the operation returns to the step S116 in the case of "$C_1 < C_{2SET}$", and advances to a step S118 to clarify the count value $C_1$ of the counter ($C_1 \leftarrow 0$), thereafter advancing to a step S119 to read out output voltage $E_L$ of the receiving element 15b provided inside the battery 5.

The rotary actuator 12 is actuated in dependency on the activating amount set in the step S115 so as to change the opening degree of the throttle valve 9a. In actual, as the time lag occurs until the change of the generator speed $S_{GE}$, the output voltage $E_L$ of receiving element 15b is read out with lapse of the predetermined time (such as 0.5-2 sec) after the activating amount of the actuator in the steps S116 and S117.

At a step S120, the voltage output from the receiving element 15b is compared with the gassing discrimination reference level $E_0$ to be determined as to whether the gassing occurs or not.

The operation advances from the step S120 to a step S121 in the case of "$E_L < E_0$" namely, when the gassing is discriminated to occur in the step S120. In the step S121, the charge discrimination flag FLAG is clarified (FLAG←0). At a step S122, the ignition signal to the ignitor 2b is cut and the rotary actuator 12 actuates to fully close the throttle valve 9a and stops to be driven, thereby stopping the engine 2 by full-closing the throttle valve 9a, so that the first and second relays RY1 and RY2 are turned off to end the charge of the battery 5. The program thus ends.

On the other hand, when the gassing is determined to be absent in the case of "$E_L > E_0$" in the step S120, the operation advances from the step S120 to a step S123 to set the charge discrimination flag "FLAG←1", thereby ending the program.

Next, there is described a second embodiment of the present invention. The second embodiment controls the charge by a quasi-constant voltage charge mode and is different from the first embodiment with reference to each function of the charge setting circuit 32 and the target generator speed setting circuit 33 shown in FIG. 3.

Namely, in the quasi-constant voltage charge mode, the charge setting circuit 32 discriminates the charge discrimination flag FLAG of the predetermined address of the memory circuit comprising the RAM 23. When the flag is "FLAG=0", namely when the battery 5 is not during the charging, the terminal voltage $V_T$ is compared with such the predetermined low limit voltage $V_L$ as 11 V. In the case of "$V_T < V_L$", the target generator speed is set in the setting circuit 34 and the charge start signal is output to the ignition driving circuit 37 and the first and second relay driving circuit 38 to start the engine 2, thereby starting the charge of the battery 5. The charge start signal is supplied also to the delay circuit 33 to count such the set time as 3-10 sec. After counting, namely, after passing the setting time from the charge start by starting the engine 2, the terminal voltage $V_T$ of the battery 5 is read out. If the battery 5 has been already charging (FLAG=1), the terminal voltage $V_T$ is read out.

When the terminal voltage $V_T$ is over such the high limit voltage $V_H$ as 15 V, or when the gassing discriminating circuit 30 discriminates the gassing occurrence, the charge discriminating flag FLAG is clarified (FLAG=0), thereby full-closing the throttle valve 9a by the rotary actuator 12 through the actuator driving circuit 36b. At the same time, the charge end signal is supplied to the rotary actuator driving circuit 36b, ignition driving circuit 37 and first and second relay driving circuit 38 with the charge end signal, thereby ending the charge by stopping the engine 2.

The target generator speed setting circuit 34 sets the generator speed $S_i$ to the constant speed $S_0$ such as 3,000 rpm in dependency on the direction from the charge setting circuit 32 so as to output to the rotary actuator activating amount setting circuit 36a.

Figure 5:
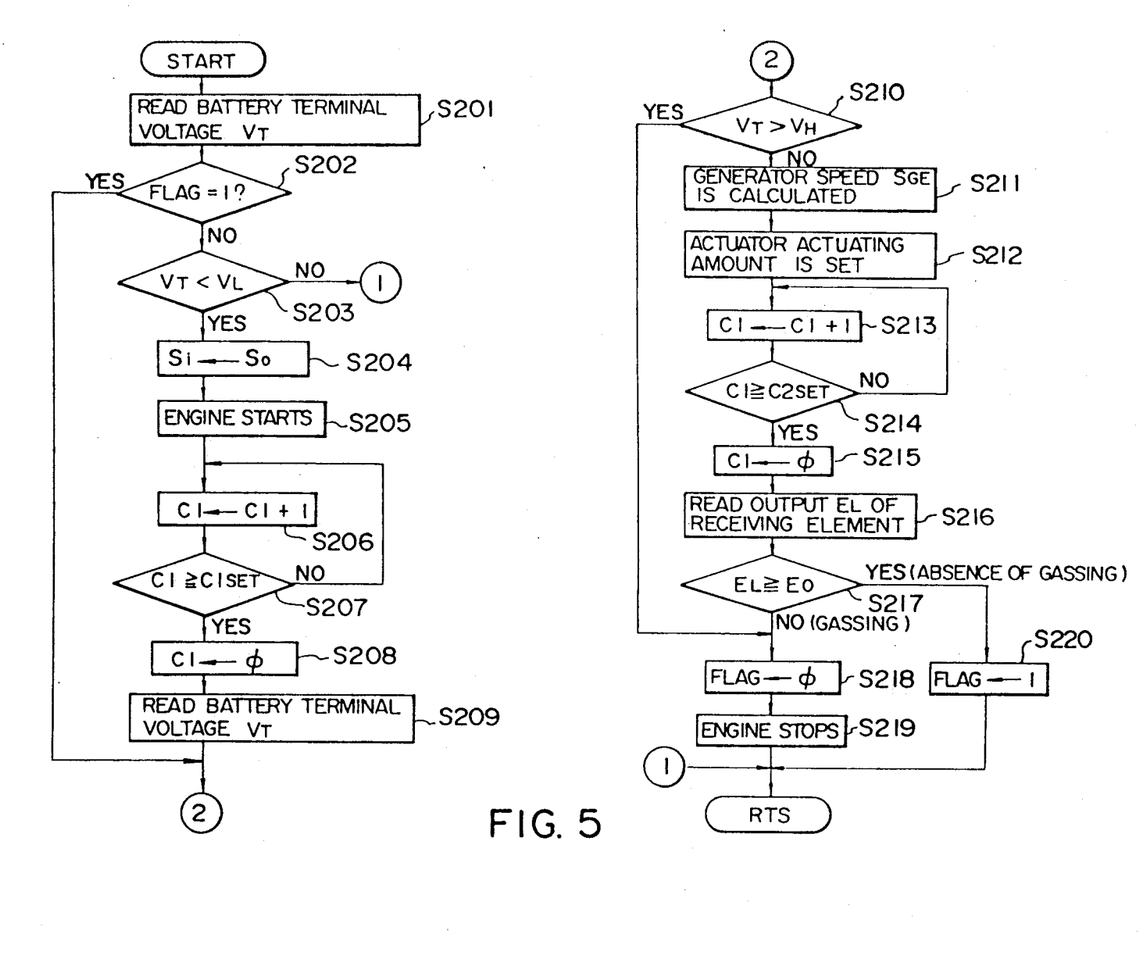
FIG. 5 is the flow chart showing a charging control procedure of the battery charging device according to a second embodiment of the present invention.

There is described a charge control procedure in the quasi-constant voltage charge mode with reference to the flow chart of FIG. 5.

At a step S201, the terminal voltage $V_T$ of the battery 5 is read out, and there is discriminated the flag FLAG for discriminating the charge of the predetermined address of the RAM 23 in a step S202.

At the step S202, when the battery 5 is discriminated to be during the charging, namely, "FLAG=1", the operation jumps to a step S210. On the contrary, when "FLAG=0", namely, the battery 5 is determined not to be charged by presently stopping the engine 2, the operation advances from the step S202 to a step S203.

At the step S203, the terminal voltage $V_T$ read in the step S201 is discriminated whether it is under the low limit voltage $V_L$ or not. The operation finishes the program when "$V_T \geq V_L$". And when "$V_T < V_L$", operation advances from the step S203 to a step S204. In the step S204, the target generator speed $S_i$ is set to an ordinary speed $S_0$ and an initial amount of the actuator is set in dependency on the ordinary speed $S_0$, thereby activating the rotary actuator 12 to open the throttle valve 9a in an initial set opening degree. In a step S205, the first and second relays RY1 and RY2 of the generator control circuit 4b are turned on to activate the generator 4 as the starter and outputs the ignition signal to the ignitor 2b to start engine.

At a step S206, the count value $C_1$ is counted up, and the value $C_1$ is discriminated to reach the set value $C_{1SET}$ in a step S207. In the case of "$C_1 > C_{1SET}$", operation returns to the step S206, and in the case of "$C_1 > C_{1SET}$", operation advances to a step S208, the count value $C_1$ of the counter is clarified. In a step S209, the terminal voltage $V_T$ is read out.

At a step S210, the terminal voltage $V_T$ read in the step S201 or S209 is discriminated as to whether it reaches the charge end voltage $V_H$ or not. In the case of "$V_T > V_H$", operation jumps to a step S218, and in the case of "$V_T < V_H$", operation advances to a step S211. In the step S211, an output signal of the generator speed sensor 12 is read to calculate the speed $S_{GE}$ of the generator, thereby advancing to a step S212.

In the step S212, a differential amount $\Delta$ is calculated by subtracting the generator speed $S_{GE}$ of the step S211 from the target generator speed $S_i$ of the step S204. An actuator activating amount is set in dependency on the differential amount $\Delta$ and output to the rotary actuator 12.

At a step S213, the count value $C_1$ is counted up, and in a step, the count value $C_1$ is discriminated as to whether the count value $C_1$ reaches the set value $C_{2SET}$ or not. In case of "$C_1 < C_{2SET}$", operation returns to the step S213. In case of "$C_1 > C_{2SET}$", operation advances to a step S215. In the step S215, the count value $C_1$ is counted up, and in a step S216, an output voltage $E_L$ of the receiving element 15b provided in the battery 5 is read out.

At a step S217, the voltage $E_L$ of the receiving element 13b is compared with the reference value $E_0$ for discriminating as to whether the gassing occurs or not.

When the gassing is determined to occur at "$E_L < E_0$" in the step S217, operation advances from the step S217 to a step S218, thereby clarifying the charge discriminating flag FLAG (FLAG←0). In a step S219, the ignition signal to the ignitor 2b is cut and the engine 2 stops by stopping the drive of the rotary actuator 10 to full-close the throttle valve 9a, thereby ending the charge of the battery 5 by turning off the first and second relays RY1 and RY2 so that the program is completed.

On the other hand, if the gassing is discriminated to be not present, namely, "$E_L > E_0$", in the step S217, operation advances from the step S217 to a step S220, thereby setting the flag "FLAG←1" for discriminating the charge, and the operation ends the program.

Figure 6:
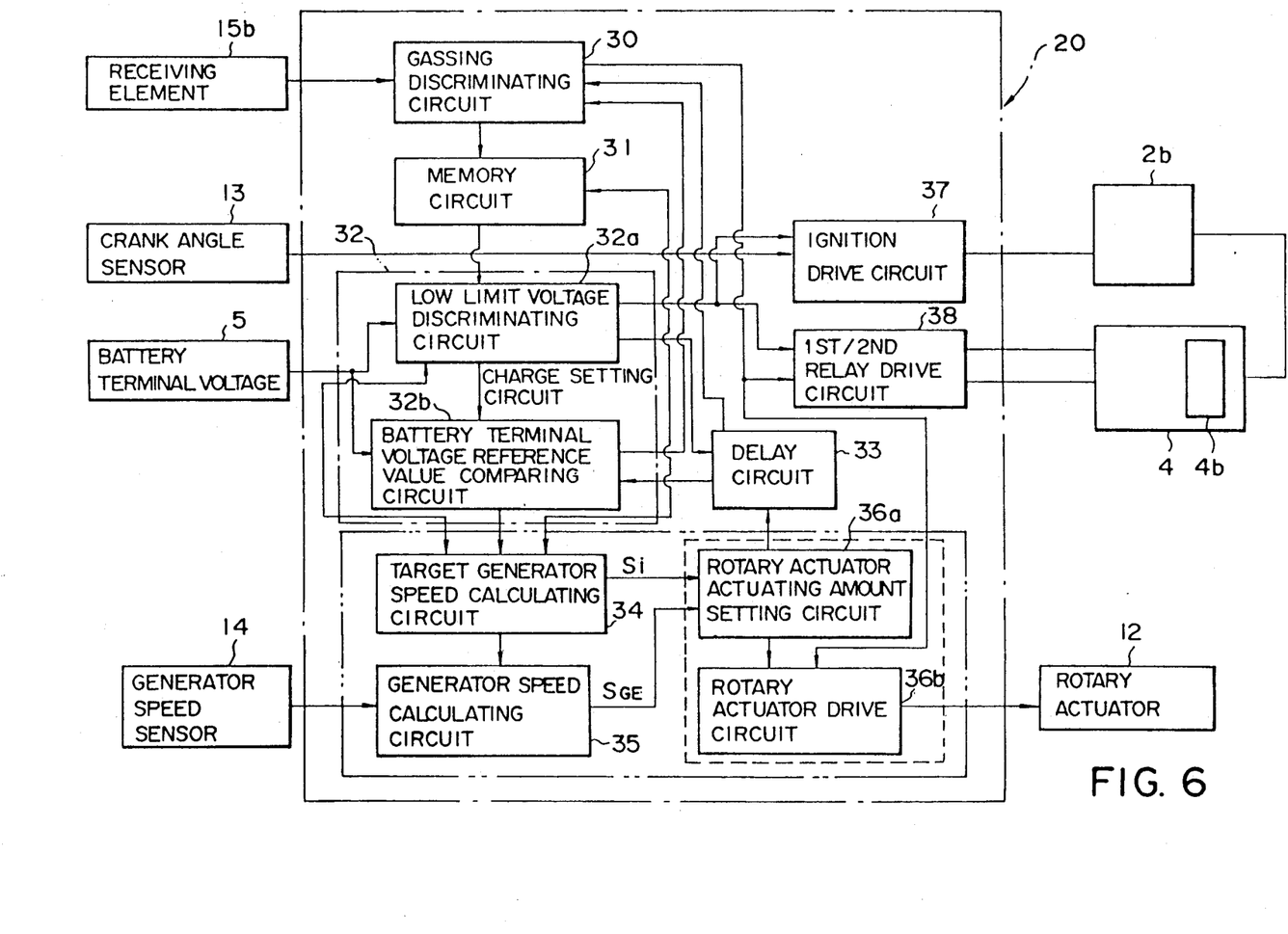
FIG. 6 is the block diagram showing the functional component of the battery charging device according to a third embodiment of the present invention.

In the above first and second embodiments, there is not described in detail the structure of the charge setting circuit 32. For example, as is shown in FIG. 6, the charge setting circuit 32 according to a third embodiment may comprise a low limit discriminating circuit 32a and a battery terminal reference value comparison circuit 32b.

The low limit discriminating circuit 32a discriminates as to whether the terminal voltage $V_T$ is under the low limit value $V_L$ or not when the charge discriminating flag FLAG of the memory circuit 31 mentioned later is zero "FLAG=0" (the engine stop condition). In case of "$V_T<V_L$", a trigger signal is output to the target generator speed setting circuit 34 of an engine speed control circuit 39, and the charge start signal is output to the ignition driving circuit 37 and the first and second relay driving circuit 38, thereby turning on the first and second relay RY1 and RY2 to operate the generator, 4 as the starter. The engine 2 therefore starts to charge the battery 5. After the predetermined time (such as 10 sec) passes after the discrimination of "$V_T<V_L$" and the start of the engine 2, the comparison operation is directed to be executed by terminal voltage reference value comparison circuit 32b.

Namely, when the charge start signal is input into the ignition drive circuit 37, the circuit 37 turns on or off the primary coil of the ignition coil 18 in a predetermined timing in dependency on the fixed ignition angle signal from the crank angle sensor 13, thereby sparking the ignition plug 19 (refer FIG. 3 showing the same structure). As shown in the figure, when the first and second relay RY1 and RY2 is turned on under the condition that the engine 2 stops, a current flows from the battery 5 through the relay RY3 and the diode D1 to the brushes 4c, thereby turning on the relay RY3 and closing the ordinarily open contact so as to form the starter circuit. In this circuit, a current flows from the brushes 4c to the field coil 4d without passing the resistor R. As a result, the generator 4 rotates by a current flowing the field coil to start the engine 2 through the belt 3. When the engine 2 starts and increases its rotational speed, the current of the starter circuit reduces step by step to be zero at last, thereby turning off the relay RY3. When the engine speed increases, the current start to flow in the opposite direction from the field coil 4d through the resistor R so as to charge the battery 5 through the diode D2.

On the other hand, in the case that the charge discriminating flag is "FLAG=1" (in condition during the charging by the drive of the engine), the low limit voltage discriminating circuit 32a instructs to execute the comparison operation directly to the battery terminal voltage reference value comparison circuit 32b.

The comparison circuit 32b discriminates as to whether the battery terminal voltage $V_T$ during the charging resides in the region between the preset high limit voltage $V_H$ (such as 15 V) or not and the low limit voltage (such as 11 V) by the instruction of the execution of the comparison operation through the low limit voltage discrimination circuit 32a or the delay circuit 33. In the case of "$V_L \leq V_T \leq V_H$", the circuit 32b directs the execution of the discriminating operation to the gassing discriminating circuit 30. In the case of "$V_L>V_T$", or "$V_H<V_T$", the circuit 32b outputs the comparison result to the target generator speed setting circuit 32a.

Other functional construction is the same as the first embodiment, thereby eliminating the duplicational description by attaching the same numerals in FIG. 3.

Furthermore, as operation of the control device according to the third embodiment is the same as the control procedure of the first embodiment described by the use of FIG. 4, the duplicated description is omitted.

Figure 7:
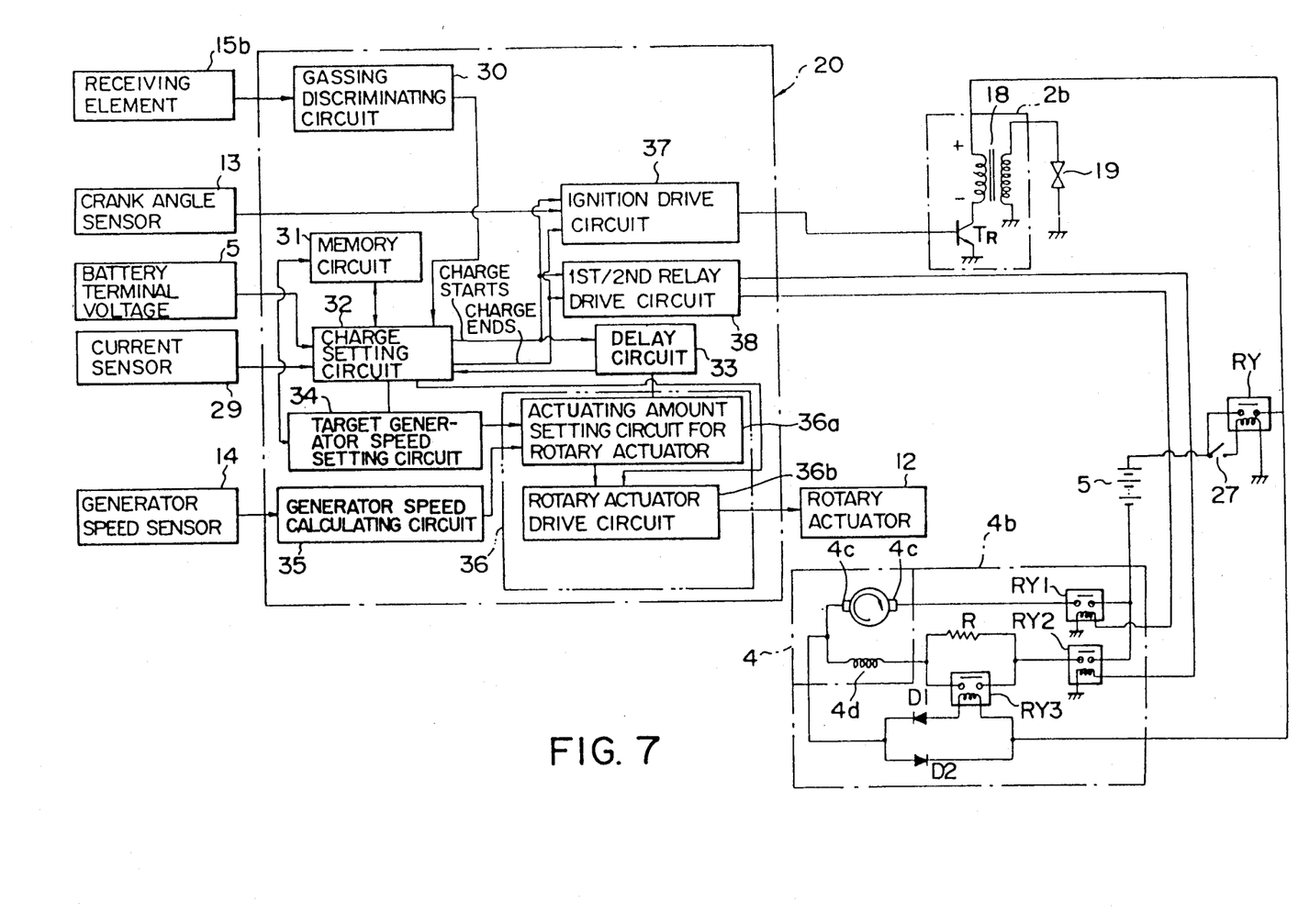
FIG. 7 is the block diagram showing the functional component of the battery charging device according to a fourth embodiment of the present invention.
Figure 8:
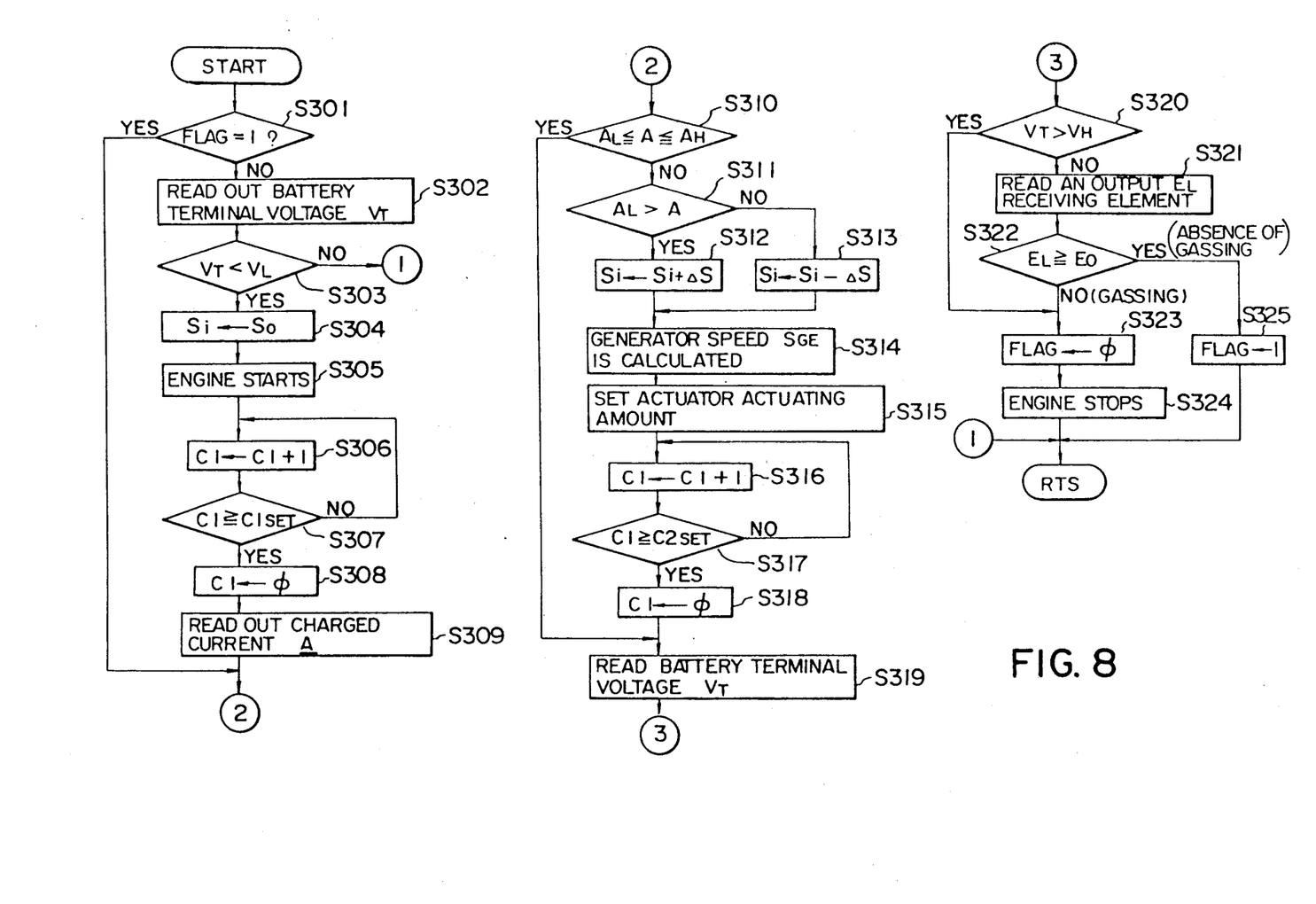
FIG. 8 is the flow chart showing the charging control procedure of the device according to the fourth embodiment.

In FIGS. 7 and 8 showing a fourth embodiment of the present invention, the battery 5 is charged by the constant current charge mode.

In the fourth embodiment, a current sensor 29 is connected between a plus terminal of the battery 5 and the control circuit 4b of the generator 4 and an output of the sensor 29 is supplied to an input port of the I/O interface 24, thereby detecting the charge current of the battery 5.

As shown in FIG. 7, the function of the control device 20 relating to the battery charge control is different from the first embodiment with reference to the charge setting circuit 32 and the target generator speed setting circuit 34. There will be described only the differences.

The charge setting circuit 32 discriminates the charge flag FLAG of the predetermined address of the memory circuit 31 comprising the RAM 23. When the flag is "FLAG=0", namely, when the battery 5 does not charge presently (in the condition of stopping the engine 2), the circuit 32 compares the terminal voltage $V_T$ of the battery 5 with the low limit voltage $V_L$. When the voltage is "$V_T<V_L$", the circuit 32 directs an initial setting execution to the generator speed setting circuit 34 and outputs the charge start signal to the ignition drive circuit 37, and the first and second relay drive circuit 38 to start the engine 2 so as to start the battery 5 charging. Furthermore, the circuit 32 reads out a charged current A detected by the current sensor 29 after the preset time passing from starting the charge by the engine start, namely, when the delay circuit 33 has counted such the set time as 3–10 sec. When the battery 5 has already been charging (FLAG=1), the circuit 32 reads the charged current A detected by the current sensor 29.

Still furthermore, the circuit 32 discriminates as to whether the charged current is in the region between a high limit current $A_H$ and a low limit current $A_L$ of the target set current or not. The circuit 32 outputs the compared result to the target generator speed setting circuit 34 when the condition is "$A_L>A$", or "$A_H<A$".

On the contrary, when the circuit 32 discriminates the condition of "$A_L \leq A \leq A_H$", or when the actuator actuating amount setting circuit 36a directs the execution of the actuator 12 through the delay circuit 33, the circuit 32 reads the terminal voltage $V_T$. When the voltage $V_T$ is over the high limit voltage $V_H$, or the gassing discriminating circuit 30 discriminates the gassing occurrence, the circuit 32 clarifies the charge flag FLAG (FLAG←0) to full-close the throttle valve 9a through the rotary actuator drive circuit 36b by the actuator, and outputs the charge end signal to the ignition drive circuit 37 and the first and second relay drive circuit 38, thereby ending the charge by stopping the engine 2.

The target generator speed setting circuit 34 sets the target generator speed $S_i$ to such the initial value $S_0$ as the 3,000 rpm by the direction of the initial set execution from the charge setting circuit 32. On the other hand, when the compared result or the circuit 32 is "$A_L>A$", the circuit 34 increases and renews the target generator speed $S_i$ by adding the set value $\Delta S$ to the present speed $S_i$ to increase the charge current A ($S_i \leftarrow S_i - \Delta S$). When the result is "$A_H < A$", the circuit 34 decreases and renews the target generator speed $S_i$ by subtracting the set speed $\Delta S$ from the present speed $S_i$ ($S_i \leftarrow S_i - \Delta S$) in order to reduce the charge current A, thereby controlling the charged current A in the output from the generator 4 within the region between the high limit current $A_H$ and the low limit current $A_L$ of the target set value.

Next, the charge control procedure of the battery 5 by the constant current charge mode with reference to the flow chart of FIG. 8.

In a step S301, the condition of the charge flag FLAG of the predetermined address of the RAM 23 is discriminated. When the condition is "FLAG=1", namely, during the battery 5 charged presently, the operation jumps from the step S301 to a step S309. On the contrary, when the condition is "FLAG=0", namely, when the battery 5 does not charge presently, operation advances from the step S301 to a step S302.

In the step S302, the terminal voltage $V_T$ is read out from the battery 5, and in a step S303, the voltage $V_T$ is discriminated to be under the low limit voltage $V_L$.

In the step S303, when "$V_T \geq V_L$", the program ends, and when "$V_T < V_L$", the operation advances from the step S303 to a step S304, the target generator speed $S_i$ is set to the initial speed $S_0$ and stored in the predetermined address of the RAM 23. The actuator initial driven amount is set in dependency on the initial speed $S_0$ of the generator speed to activate the rotary actuator 12 for opening the throttle valve 9a in the initial set opening degree. In a step S305, the first and second relays RY1 and RY2 of the generator control circuit 4b are turned on to operate the generator 4 as the starter, and at the same time, the ignition signal is output to the ignitor 2b to start the engine 2, thereby starting the charge of the battery 5.

Advancing operation to a step S306, the count value $C_1$ of the counter is counted up. In a step S307, count value $C_1$ is discriminated as to whether the count value $C_1$ reaches the set value $C_{1SET}$ or not. When "$C_1 < C_{1SET}$", operation returns to the step S306, and when "$C_1 > C_{1SET}$", advances to a step S308 to clarify the count value $C_1$ of the counter. In the step S309, the charged current A of the battery is read out of the output of the current sensor 29.

The set of the delay time in the steps S306 to S307, is to read the charged current when the predetermined time (such as 3-10 sec) is passed after starting the engine to stabilize the engine speed.

In a step S310, when the current is discriminated to be "$A_L < A$" or "$A_H < A$", operation advances to a step S311 to compare the charged current A read in the step S309 with the low limit current $A_L$ of the target set value. When the current is discriminated to be "$A_L > A$", operation advances to a step S312 to read out the target generator speed $S_i$ stored in the RAM 23 to thus increase and renew the target generator speed $S_i$ by adding the set speed $\Delta S$ therewith ($S_i S_i + \Delta S$). Namely, when the battery charged current A is under the target set current low limit current $A_L$, the target generator speed $S_i$ increases for the predetermined set speed $\Delta S$ in order to increase the charged current A.

When the current A is "$A_L < A$" i.e. "$A > A_H$" in the step S311, operation advances to a step S313 to renew the target generator speed $S_i$ by subtracting the set speed $\Delta S$ from the present target generator speed $S_i$ stored in the RAM 23 ($S_i \leftarrow S_i - \Delta S$). Namely, when the charged current A is over the high limit voltage $V_H$, the target generator speed $S_i$ is reduced for the set value $\Delta S$ to decrease the charged current A.

Advancing to a step S314, an actual generator speed $S_{GE}$ is calculated after being read out the signal output from the generator speed sensor 14. In a step S315, a differential amount $\Delta$ is calculated by subtracting the calculated generator speed $S_{GE}$ in the step S314 from the target generator speed $S_i$ set in the step S312 or S313 ($\Delta = S_i - S_{GE}$), thereby setting the activating amount of the rotary actuator 12 in dependency on the differential amount $\Delta$.

In a step S316, the count value $C_1$ of the counter is counted up, and in a step S317, the count value $C_1$ is discriminated to reach the set value $C_{2SET}$. When "$C_1 < C_{2SET}$", operation returns to the step S316, and when "$C_1 > C_{2SET}$", operation advances to a step S318, thereby clarifying the count value $C_1$ of the counter.

Advancing to a step S319, the battery terminal voltage $V_T$ is read out, and the voltage $V_T$ is discriminated as to whether the voltage $V_T$ reaches the high limit voltage $V_H$ or not, in the step S320. When "$V_T > V_H$", operation jumps to a step S323, and when "$V_T < V_H$", advances to a step S321 to read out the output voltage $E_L$ of the receiving element 15b provided in the battery 5.

In a step S322, the voltage $E_L$ is compared with the gassing discriminating reference value $E_0$ to discriminate the gassing occurrence. When the gassing is discriminated to occur, operation advances from the step S322 to the step S323 to clarify the charge discriminating flag FLAG (FLAG←0). In a step S324, the ignition signal to the ignitor 2b is cut and the drive of the rotary actuator 12 stops, thereby stopping the engine 2 and turning off both the relays RY1 and RY2 of the generator control circuit 4b, so that the operation finishes the program.

On the other hand, when the gassing is discriminated to be absent at "$E_L > E_0$" in the step S322, operation advances from the step S322 to a step S325 to set the charge discriminating flag to "FLAG←1", thereby finishing the program.

There will be described a fifth embodiment of the present invention.

The fifth embodiment relates to a charge device by a constant current charge mode of each stage having plural stages, and is different from the fourth embodiment at each function of the charge circuit 32 and the target generator speed setting circuit 40 as shown in FIG. 7.

Namely, the charge setting circuit 32 of the fifth embodiment directs the initial setting execution to the target generator speed setting circuit 34 when the battery 5 initially charges by starting the engine 2. The circuit 32 sets a charge set current $A_1$ to the initial current $A_0$ corresponding to the charge current A and respectively sets the high limit current $A_H$ and the low limit current $A_L$ of the target set current respectively by adding and subtracting an allowable width $\Delta A$ to and from the charge set current $A_1$ ($A_H \leftarrow A_1 + \Delta A$, $A_L A_1 + \Delta A$). An actual charge current A detected by the current sensor 18 is compared with the high limit current $A_H$ and low limit current $A_L$, respectively, after the preset time from the charge start by starting the engine 2, thereby outputting its comparison result to the target generator speed setting circuit 34.

After that, when the terminal voltage $V_T$ is over the high limit voltage $V_H$ such as 15 V, or when the gassing discriminating circuit discriminates the gassing to occur, the charge set current $A_1$ is reduced step by step by subtracting a predetermined decrease current $A_D$ from the charge set current $A_1$ ($A_1 \leftarrow A_1 - A_D$).

The charge set current $A_1$ is compared with the charge end current $A_F$. When "$A_1 > A_F$", the charge set current $A_1$ is reset by the decrease and the high limit current $A_H$ and low limit current $A_L$ are set respectively by adding and subtracting the allowable width $\Delta A$ to and from the reset current $A_1$.

When the charge set current $A_1$ is under the charge end current $A_F$, the charge flag is clarified (FLAG=0), so that the charge end signal is output to the rotary actuator drive circuit 36b, ignition circuit 37, and the first and second relay drive circuit 38, thereby ending the charge by stopping the engine 2.

Figure 9:
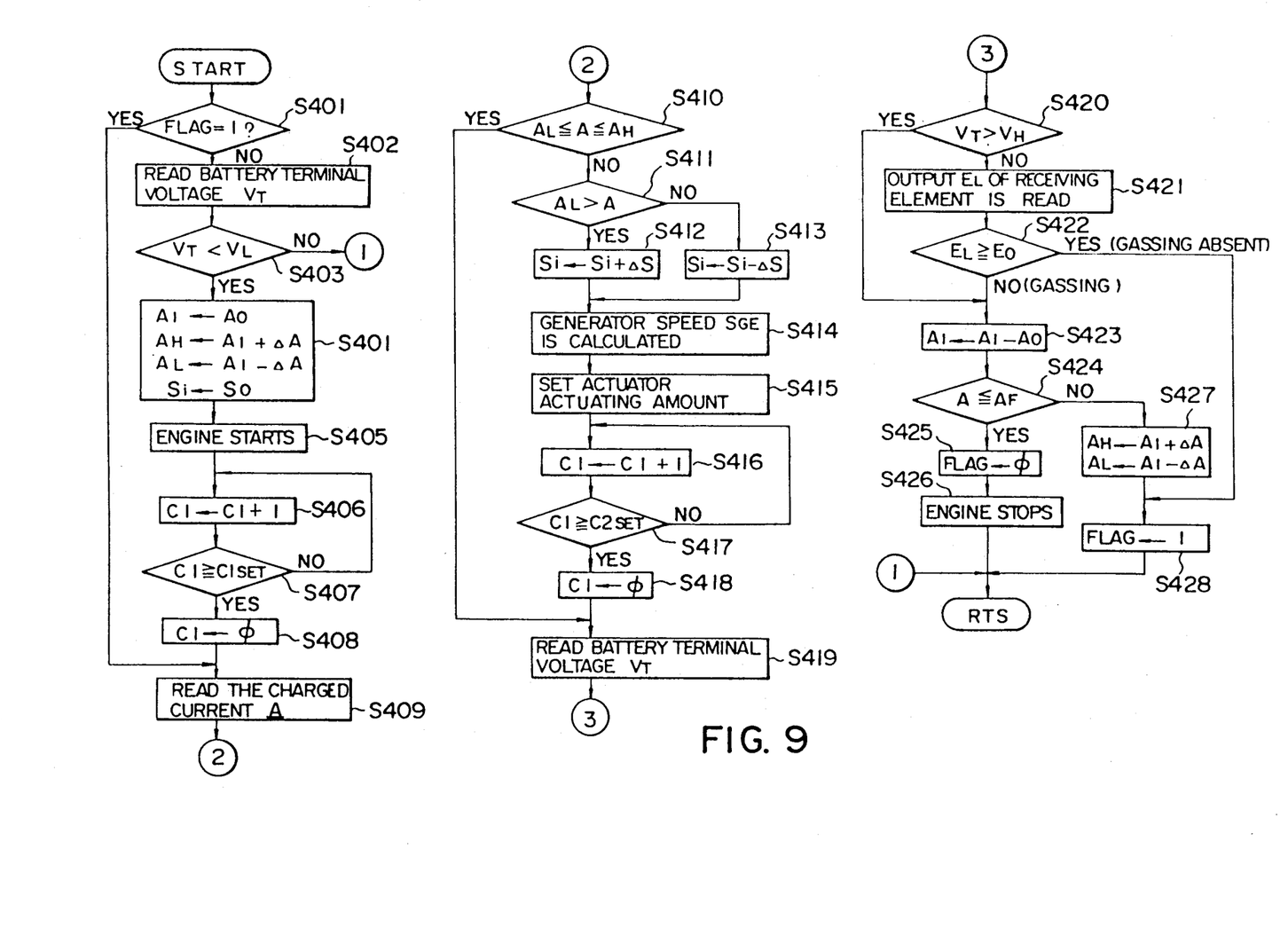
FIG. 9 is the flow chart showing the charging control procedure of the battery charging device according to a fifth embodiment of the present invention.

There is described the charge control procedure of the battery 5 with reference to the flow chart shown in FIG. 9.

The operation advances through steps S401 and S402 to a step S403. When "$V_T > V_L$", the program finished, and when "$V_T < V_L$", operation advances to a step S404. The steps S401 and S402 correspond to the steps S301 and S302.

In the step S404, the charge set current $A_1$ is set to the preset initial value $A_0$ ($A_1 \leftarrow A_0$), the high limit current $A_H$ and the low limit current $A_L$ of the target set value are respectively set by adding and subtracting the allowable width $\Delta A$ to and from the charge set current $A_1$ ($A_H \leftarrow A_1 + \Delta A$, and $A_L \leftarrow A_1 \Delta A$). Furthermore, the target generator speed $S_t$ is set to the initial speed $S_0$ ($S_t \leftarrow S_0$), thereby storing the speed $S_t$ in the predetermined address of the RAM 23.

The initial drive amount of the actuator is set in dependency on the initial speed $S_0$ to activate the rotary actuator 12 so as to open the throttle valve 9a in the initial set opening degree, thereby turning on the first and second relays RY1 and RY2 of the generator control circuit 4b in a step S405 to activate the generator 4 as a starter, so that the charge starts by starting the engine 2 in dependency on the ignition signal to the ignitor 2b.

In a step S406, the count value $C_1$ of the counter is counted up, and in a step S407, count value $C_1$ is discriminated to reach the set value $C_{1SET}$. When "$C_1 < C_{1SET}$", operation returns to the step S406, and when "$C_1 \geq C_{1SET}$", operation advances to a step S408. In the step S408, the count value $C_1$ is clarified, and in a step S409, the charged current A of the battery 5 is read in dependency on the output of the current sensor 29.

Operation advances through steps S410–S419 which is the same steps as the steps S310–S319 of the fourth embodiment, to a step S420. In the step S420, the battery terminal voltage $V_T$ is discriminated as to whether or not it reaches to the high limit voltage $V_H$. When "$V_T > V_H$", operation jumps from the step S420 to a step S423, and when "$V_T < V_H$", operation advances from the step S420 to a step S421 to read out the output voltage $E_L$ of the receiving element 15b of the battery 5.

In a step S422, the output voltage $E_L$ of the receiving element 15b is compared with the gassing discriminating reference voltage $E_0$ to discriminate as to whether the gassing occurs or not. When the gassing is discriminated to occur at "$E_L < E_0$", operation advances from the step S422 to the step S423. When the gassing is absent at "$E_L > E_0$", operation jumps to a step S428 to set the charge flag to be "FLAG←1", thereby finishing the program.

On the other hand, in the step S423, the charge set current $A_1$ is read out from the predetermined address of the RAM 23. The charge set current $A_1$ is reset by subtracting the decrease current $A_D$ from the present charge set current $A_1$ ($A_1 \leftarrow A_1 - A_D$), thereby advancing to a step S424 to discriminate whether the reset charge set current $A_1$ reaches the charge end value $A_f$ or not.

In the step S424, when "$A_1 \leq A_F$", operation advances from the step S424 to a step S425 to clarify the charge flag (FLAG←0), and to a step S426 to stop the engine 2 and the charge of the battery 5, thereby ending the program.

On the other hand, in the step S424, when "$A_1 > A_F$", operation advances from the step S424 to a step S427 to set the high limit current $A_H$ and low limit current $A_L$ of the target set value by adding and subtracting the allowable width $\Delta A$ to and from the reset charge current $A_1$ in the step S423, respectively ($A_H \leftarrow A_1 + \Delta A$, $A_L \leftarrow A_1 - \Delta A$).

In the step S428, the charge flag is set to "FLAG←1" to finished the program.

As the present invention detects the gassing as described above, it is possible to constantly and precisely control the charging and to prevent energy loss, thereby improving the charging efficiency.

According to the present invention, the battery has a long-life and it is possible to prevent a danger by flammable gases.

While the presently preferred embodiments of the present invention have been shown and described, it is to be understood these disclosures are for the purpose of illustration and that various changes and modifications may be made without departing from the scope of the invention as set forth in the appended claims.

What is claimed is:

1. A battery charging system for motor-generator mounted on an electric vehicle, said vehicle having a battery, a motor provided to drive an axle of said vehicle depending on the electric energy supplied from said battery, a generator connected to said battery, an engine provided to drive said generator for charging said battery, engine speed changing means for variably changing an engine speed, generator speed detecting means for detecting a generator speed and for generating a generator speed signal indicative thereof and battery terminal voltage sensing means for sensing a battery terminal voltage and for generating a battery terminal voltage signal indicative thereof, said system comprising:

charge setting means responsive to said battery terminal voltage signal for discriminating a condition where the battery should be charged;

engine driving means for driving said engine only while said condition is discriminated by said charge setting means;

target generator speed setting means for setting a target speed of said generator while said charge setting means discriminates said condition and for generating a target speed signal indicative thereof; and engine speed control means responsive to said generator speed signal and said target speed signal for actuating said engine speed changing means to control the engine speed in the manner that said generator speed converges to said target speed.

2. The system according to claim 1 combined with a battery terminal voltage sensor and a generator speed sensor.

3. The system according to claim 1 mounted on an electric vehicle having a battery, a motor provided to drive an axle of said vehicle depending on the electric energy supplied from said battery, a generator connected to said battery, an engine provided to drive said generator for charging said battery.

4. The system according to claim 1 combined with an ignitor provided to spark an ignition plug in response to a signal from said engine driving means.

5. The system according to claim 1 combined with a rotary actuator for actuating a throttle valve in response to a signal from said engine speed control means.

6. The system according to claim 1, wherein said charge setting means comprises:
 low limit discriminating means for discriminating that said battery terminal voltage is lower than a preset voltage and for demanding starting operation of said engine to said engine driving means; and
 battery terminal voltage reference value comparing means for comparing said battery terminal voltage with a region between a preset high limit value and a preset low limit value during the operation of the engine.

7. The system according to claim 1, wherein said charge setting means is adapted to discriminate a charge start time when said battery terminal voltage becomes lower than a preset low limit value and to discriminate a charge end time when said battery terminal voltage becomes higher than a preset high limit value.

8. The system according to claim 1, wherein said engine speed control means includes:
 actuating amount setting means for calculating a difference between said target speed and said generator speed; and
 actuator driving mean responsive to said difference for driving said engine speed changing means.

9. The system according to claim 1, further comprising:
 gas detecting means for detecting an amount of gas generated in said battery due to the overcharge; and
 gassing discriminating means for discriminating the occurrence of gassing when said amount of gas becomes larger than a preset reference value, thereby terminating the operation of the engine to stop charging of the battery.

10. The system according to claim 1, wherein said engine driving means comprises:
 first driving means for producing a signal to spark an ignition plug mounted on the engine at a predetermined ignition angle, thereby operating the engine; and
 second driving means for producing signals to a generator control circuit combined with said generator to start the rotation of said generator, thereby starting the rotation of said engine.

11. The system according to claim 6, wherein a value of said preset voltage is equal to said preset low limit value.

12. The system according to claim 6, wherein said target generator speed setting means is adapted to increase said target speed when said battery terminal voltage is lower than said preset low limit value and to decrease said target speed when said battery terminal voltage is higher than said preset high limit value.

13. The system according to claim 7, wherein said target generator speed setting means is adapted to set said target speed to a fixed speed during a period between said charge start time and said charge end time.

14. A battery charging system for motor-generator mounted on an electric vehicle, said vehicle having a battery, a motor provided to drive an axle of said vehicle depending on the electric energy supplied from said battery, a generator connected to said battery, an engine provided to drive said generator for charging said battery, engine speed changing means for variably changing an engine speed, generator speed detecting means for detecting a generator speed and for generating a generator speed signal indicative thereof, battery terminal voltage sensing means for sensing a battery terminal voltage and for generating a battery terminal voltage signal indicative thereof and current sensing means for sensing a current flowing from said battery to said generator and for generating a current signal indicative thereof, said system comprising:
 charge setting means responsive to said battery terminal voltage signal and said current signal for discriminating a condition where the battery should be charged;
 engine driving means for driving said engine only while said condition is discriminated by said charge setting means;
 target generator speed setting means for setting a target speed of said generator while said charge setting means discriminates said condition and for generating a target speed signal indicative thereof; and
 engine speed control means responsive to said generator speed signal and said target speed signal for actuating said engine speed changing means to control the engine speed in the manner that said generator speed converges to said target speed.

15. The system according to claim 14, further comprising:
 gas detecting means for detecting an amount of gas generated in said battery due to the overcharge; and
 gassing discriminating means for discriminating the occurrence of gassing when said amount of gas becomes larger than a preset reference value, thereby terminating the operation of the engine to stop charging of the battery.

16. The system according to claim 14, wherein said charge setting means is adapted to demand starting the operation of said engine to said engine drive means when the battery terminal voltage becomes lower than a preset low limit voltage and demand stopping the operation of said engine when said battery terminal voltage becomes higher than a preset high limit voltage.

17. The system according to claim 15, wherein said target generator speed setting means is adapted, during the operation of the engine, to increase said target speed when said current is lower than a preset low limit current and to decrease said target speed when said current is higher than a preset high limit current.

* * * * *